United States Patent [19]
Yanagihara et al.

[11] Patent Number: 5,922,369
[45] Date of Patent: Jul. 13, 1999

[54] APPARATUS FOR MAKING A SYNTHETIC RESIN LAYERED LENS FOR A VEHICLE LIGHTING DEVICE

[75] Inventors: Hirokazu Yanagihara; Shiro Takezawa, both of Shizuoka, Japan

[73] Assignee: Koito Manufacturing Co., Ltd., Tokyo, Japan

[21] Appl. No.: 08/925,591

[22] Filed: Sep. 8, 1997

Related U.S. Application Data

[63] Continuation of application No. 08/442,512, May 16, 1995., abandoned, which is a division of application No. 08/245,540, May 18, 1994., Pat. No. 5,721,039

[30] Foreign Application Priority Data

May 18, 1993 [JP] Japan ..................................... 5-115536

[51] Int. Cl.⁶ .................................................. B29C 45/16
[52] U.S. Cl. .................. 425/572; 264/297.8; 264/328.8; 264/328.9; 425/576
[58] Field of Search ..................................... 425/130, 572, 425/576; 264/328.8, 328.9, 328.12, 297.8

[56] References Cited

U.S. PATENT DOCUMENTS

| | | | |
|---|---|---|---|
| 4,714,535 | 12/1987 | Coombes, Jr. et al. | 204/297 |
| 4,885,121 | 12/1989 | Patel | 425/130 |
| 5,275,764 | 1/1994 | Hettinga . | |
| 5,413,743 | 5/1995 | Prophet . | |
| 5,415,817 | 5/1995 | Shiao et al. | 264/328.12 |
| 5,523,030 | 6/1996 | Kingsbury | 264/328.8 |

FOREIGN PATENT DOCUMENTS

| | | |
|---|---|---|
| 152976 | 5/1969 | Germany . |
| 2607231 | 12/1993 | Japan . |
| 5337983 | 12/1993 | Japan . |

*Primary Examiner*—Tim Heitbrink
*Attorney, Agent, or Firm*—Sughrue, Mion, Zinn, Macpeak & Seas, PLLC

[57] ABSTRACT

A synthetic resin layered lens for a vehicle lighting device in which an upper lens layer is disposed on a lower lens layer thereby forming a layered lens of integral construction. The lower lens layer is molded in a state that the surface of the lower lens layer where it contacts the upper lens layer, faces the injection gate. The gate scar of the lower layer is thus hidden by the upper layer.

8 Claims, 4 Drawing Sheets

APPARATUS FOR MAKING A SYNTHETIC RESIN LAYERED LENS FOR A VEHICLE LIGHTING DEVICE

This is a Continuation of application Ser. No. 08/442,512 filed on May 16, 1995, entitled SYNTHETIC RESIN LAYERED LENS FOR A VEHICLE LIGHTING DEVICE, METHOD OF MOLDING THE SAME AND APPARATUS THEREFORE, now abandoned which is a divisional of application Ser. No. 08/245,540, filed on May 18, 1994 now U.S. Pat. No. 5,721,039.

BACKGROUND OF THE INVENTION

1. Field of the Invention

The present invention relates to a synthetic resin layered lens for a vehicle lighting device, which consists of a lower lens layer and an upper lens layer disposed on the lower lens layer, and a method of molding such a layered lens.

2. Description of the Related Art

FIGS. 8 and 9 show a typical conventional layered lens. As shown, the layered lens consists of two layers, a white lower lens layer 1 of lens and a red upper lens layer 3. The lower lens layer 1 has seal legs 2. The upper lens layer 3 is disposed on the lower lens layer 1, forming a layered lens of one piece construction. To manufacture the layered lens, a mold assembly as shown in FIG. 11 is used.

As shown, the mold assembly includes a fixed table 5 and a rotary table 6 located above the fixed table 5. The fixed table 5 includes molds A and B. The rotary table 6 includes molds C and D corresponding to the molds A and B. The lower lens layer 1 (indicated by a phantom line in FIG. 10) is first formed using the molds A and C. The rotary table 6 is then turned by 180° in a state that the product (lower lens layer 1) is placed in the upper mold C. The upper lens layer 3 (indicated by a phantom line in FIG. 10) is formed on the lower lens layer 1, using the molds B and C. In this way, a one piece of the layered lens, consisting of the lower lens layer 1 and the upper lens layer 3 disposed on the lower lens layer 1, is manufactured. In the lens layer 1 and the upper lens layer 3 disposed on the lower lens layer 1, is manufactured. In the figure, reference numeral 7 designates an injection hole for injecting molten resin into the runner of the mold A. Numerals 8 and 9 designate nozzles for injecting molten resin into the injection holes 7.

The layered lens as the molded product has two gate scars G1 and G2 (see FIG. 9). The gate scar G1 is created in the seal legs 2 during the process for molding the lower lens layer 1. The gate scar G2 is created at the circumferential edge of the upper lens layer 3 during the process for molding the upper lens layer 3. These scars reduce the appearance of the lens. The scars also are dangerous to workers handling the lens. To avoid harm, an additional process to cut off the gate scars is essentially required.

The gate scar G1 creates another problem when the layered lens thus produced is assembled into a vehicle lighting device. When the seal legs 2 are inserted into the groove of the lamp body of the vehicle lighting device, air is introduced into the sealing material in the seal groove due to deformation caused by the gate scar. The air impairs the sealing material which seals the gap between the seal legs and the seal groove.

In the peripheral region of the gate scar of the layered lens, a stress region formed during the molding process remains as an initial stress. Gasoline, wax for car washing, and like, when applied, makes this stressed region fragile and more likely to crack. Cracks will lessen the water-proof characteristics of the lens.

SUMMARY OF THE INVENTION

An object of the present invention is to provide a synthetic resin layered lens for a vehicle lighting device in which the gate scar of the seal legs is completely concealed, and a method of molding such a layered lens.

To achieve the above object, a synthetic resin layered lens for a vehicle lighting device has an upper lens layer which is layered on a lower lens layer having seal legs thereby forming a layered lens of one piece construction. The lower lens layer is molded in a state that the surface of the lower lens layer where it contacts with the upper lens layer, faces the injection gate, and so that a gate scar formed on the lower lens layer is formed on the contact surface of the lower lens layer.

A method of molding a synthetic resin layered lens for a vehicle lighting device has a lower lens layer molding process using a first mold, and a lens layering process for layering an upper lens layer on the lower lens layer by using a second mold receiving the lower lens layer molded by the lower lens layer molding process. In the lower lens layer molding process, the molding process is carried out in a state that the surface of the lower lens layer where it contacts with the upper lens layer, faces the injection gate.

The gate scar formed when the lower lens layer is thus formed on the contact surface of the lower lens layer where it contacts with the upper lens layer Accordingly, the scar is completely concealed by the upper lens layer when it is disposed on the lower lens layer.

DETAILED DESCRIPTION OF THE PREFERRED EMBODIMENT

Figure 1:
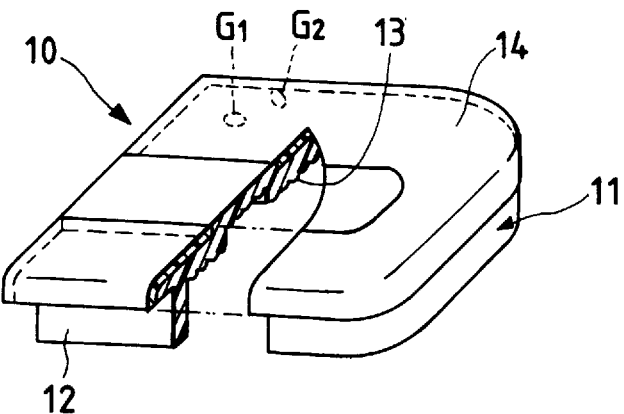
FIG. 1 is a perspective view, in partial section, showing a layered lens according to a preferred embodiment of the present invention.
Figure 2:
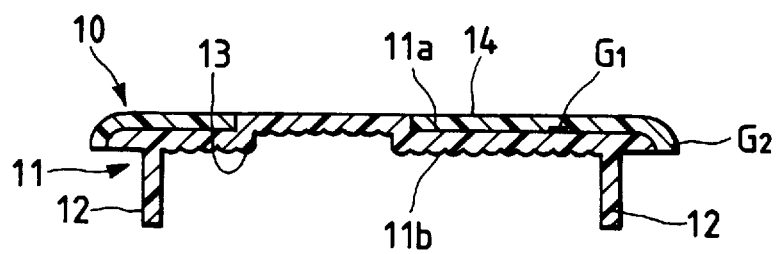
FIG. 2 is a longitudinal sectional view showing the lens of FIG. 1.

FIGS. 1 and 2 illustrate a lens of a vehicle stop lamp according to a preferred embodiment of the present invention.

Figure 3:
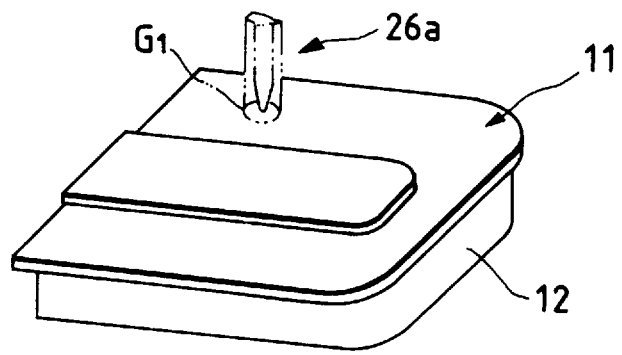
FIG. 3 is a perspective view showing how the lower lens layer of the lens is molded.
Figure 4:
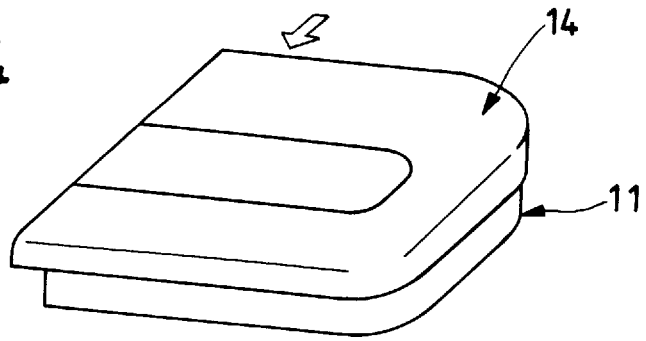
FIG. 4 is a perspective view showing how the upper and lower lens layers are coupled into a layered lens of one piece construction.

The lens 10 of the stop lamp consists of a white lower lens layer 11 with seal legs 12 and a red upper lens layer 14. The upper lens layer 14 is disposed on the lower lens layer 11 to form a layered lens of integral construction. The lens 10 is manufactured by a mold assembly shown in FIG. 5. The lower lens layer 11 with a stepped portion 11a formed on the upper surface thereof as shown in FIG. 3 is first formed by the mold assembly. Then, the upper lens layer 14 is formed over the lower lens layer 11 in a state that the upper surface of the stepped portion 11a is flush with the upper surface of the upper lens layer 14. As a result, a layered lens of integral construction is formed. An arrow in FIG. 4 indicates the direction in which molten resin is injected from the injection nozzle to the cavity when the upper lens layer 14 is molded.

A gate scar G1, which is formed when the lower lens layer 11 is molded, is left on the surface of the lower lens layer 11 where it contacts with the upper lens layer 14 in a manner described below. However, this scar G1 is covered with the red upper lens layer 14 layered on the lower lens layer 11, and is thus hidden by the upper lens layer 14. Fisheye steps or ridges 13 are formed in the back surface 11b of the lower lens layer 11 (see FIG. 2). Provision of the fisheye steps 13 serves to hide further the gate scar G1 from view. A gate scar G2, which is formed when the upper lens layer 14 is molded, is formed at the circumferential edge of the upper lens layer 14 in a manner described below. The scar G2 is easily removed by a cutting operation after the molding process.

Thus, the gate scar G2 of the upper lens layer 14 is in view, but the gate scar G1 of the lower lens layer 11 is hidden from sight. Therefore, the outside appearance of the lens is improved.

The post process for cutting off gate scars is carried out only for the gate scar G2 of the upper lens layer. Accordingly, this process is simpler than that for the conventional lens molding, which must be carried for the gate scars of both layers.

Figure 5:
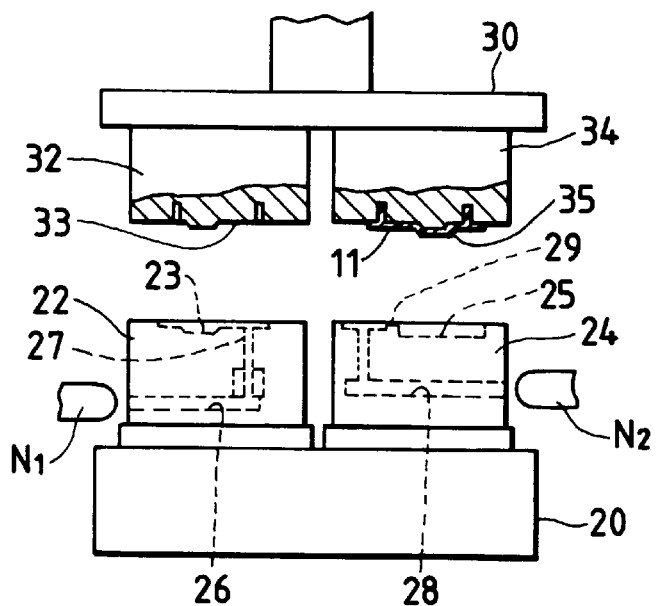
FIG. 5 is a front view showing a mold assembly for forming the layered lens by molding process.
Figure 11:
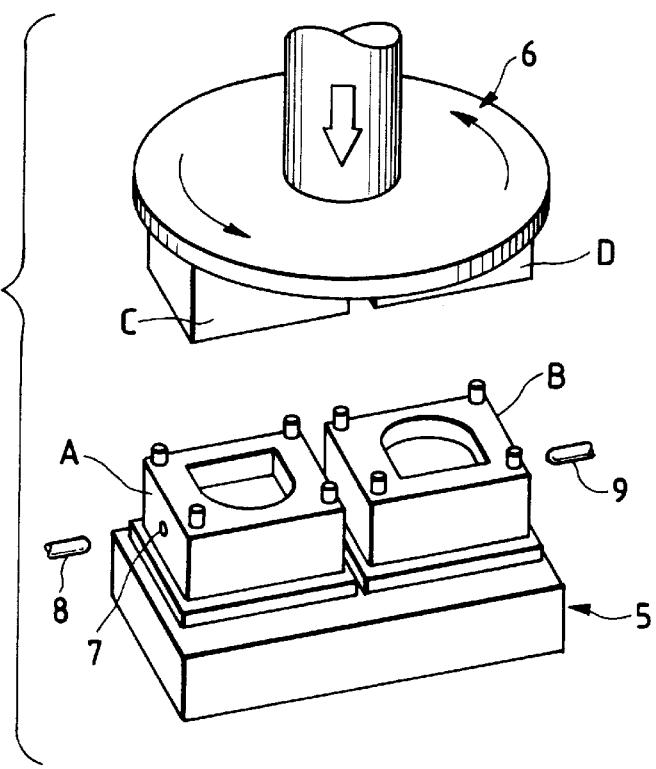
FIG. 11 is a perspective showing a mold assembly for molding the conventional layered lens.

The mold assembly shown in FIG. 5, like the conventional mold assembly (FIG. 11), includes a fixed table 20 and a rotary table 30 located above the fixed table. The fixed table 20 has two lower molds 22 and 24. The rotary table 30 has also two upper molds 32 and 34 corresponding to the lower molds 22 and 24. The rotary table 30 is movable toward and away from the fixed table 20 in a known manner.

Figure 6:
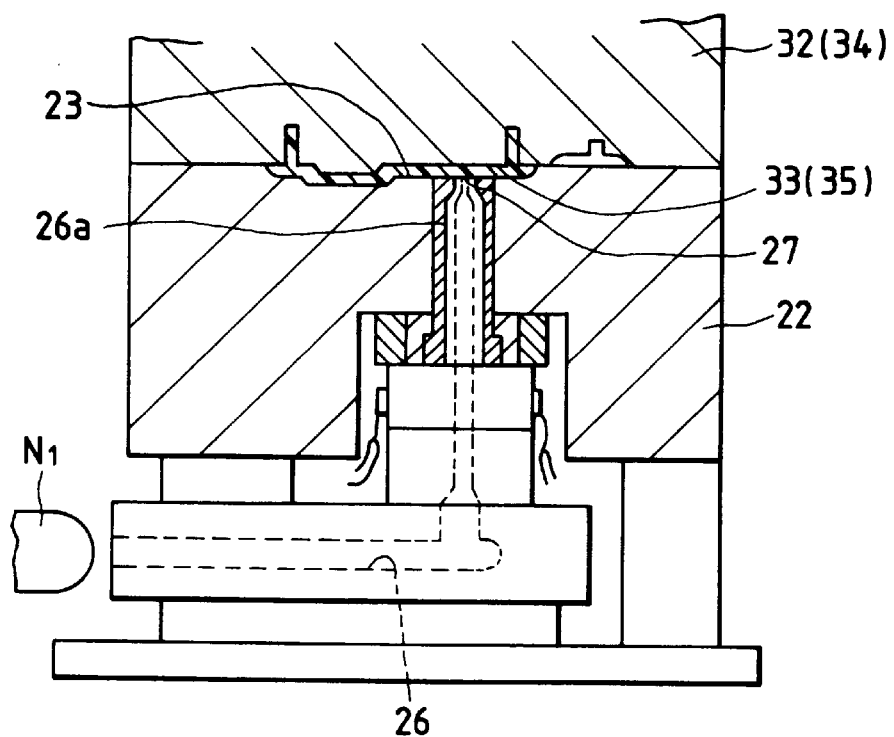
FIG. 6 is a cross-sectional view showing a mold for forming the lower lens layer of lens.

The lower mold 22 includes a molding surface 23 for forming the front face of the lower lens layer 11 which has stepped portion 11a. A gate 27 of a molding surface 23 in lower mold 22 is a molten resin injection port of a hot runner 26 vertically extending through the lower mold 22. The molding surface 23 cooperates with the molding surface 33 of the upper mold 32 for molding the lower lens layer 11. N1 indicates an injection nozzle for injecting molten resin into the resin injection port of the hot runner 26. The lower mold 22 is provided with a tubular hot tip 26a vertically extending through the mold 22 (see FIG. 6). The hot tip 26a is a part of the hot runner 26. Temperature of resin within the hot tip 26a is controlled to values suitable for the respective processes of clamping, injection, cooling, and mold break in a known manner.

Figure 7:
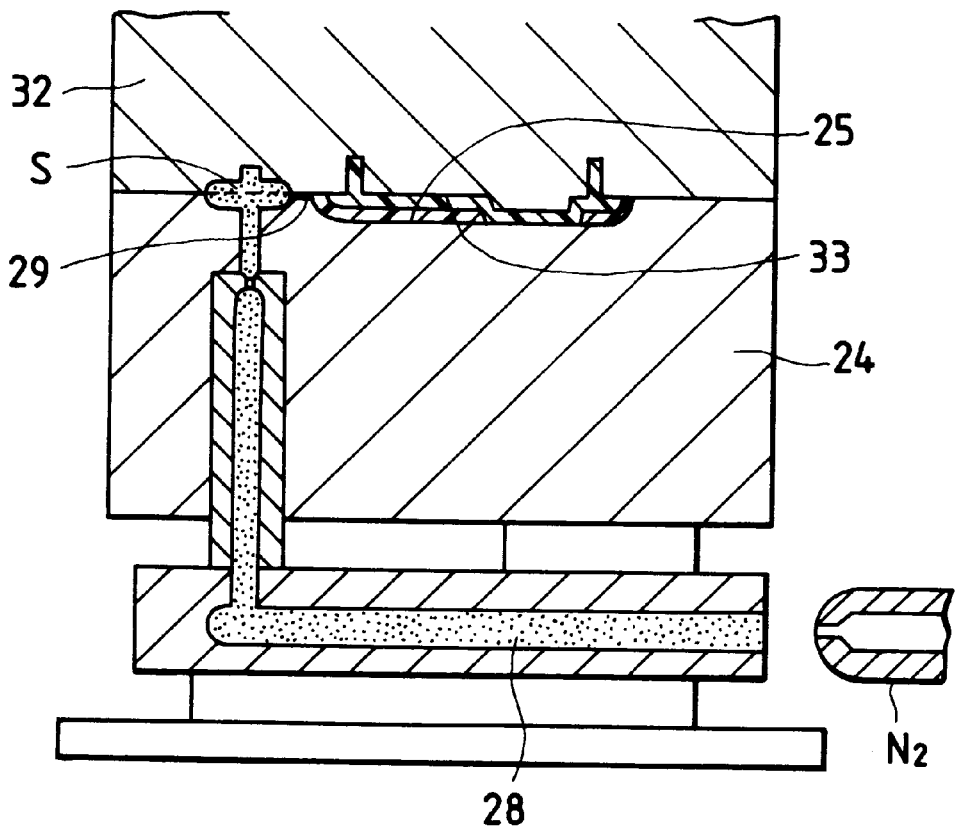
FIG. 7 is a cross sectional view showing a mold for forming the upper lens layer of lens.
Figure 8:
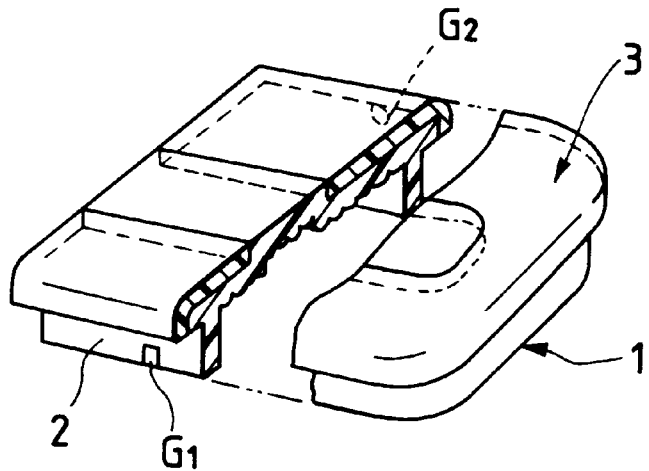
FIG. 8 is a perspective view showing a conventional layered lens.
Figure 9:
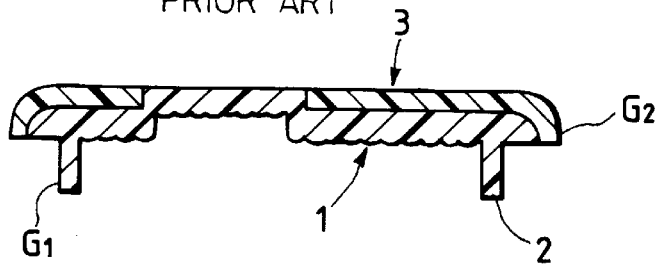
FIG. 9 is a longitudinal sectional view of the conventional layered lens.
Figure 10:
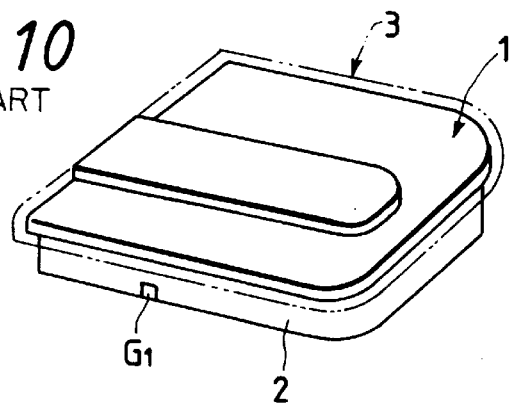
FIG. 10 is an explanatory diagram for explaining how the conventional layered lens is molded.

The lower mold 24 is provided with a molding surface 25 for forming the lens upper lens layer. A gate 29 is formed in the side edge part of the molding surface 25. The gate 29 is a molten resin injection port connecting to a hot runner 28 formed in the lower mold 24, through a sprue S provided at the fore end of the hot runner 28 (see FIG. 7). The molding surface 25 of lower mold 24 cooperates with the molding surface 33 of the upper mold 32 to layer the upper lens layer 14 on the lower lens layer 11, thereby forming a lens of one piece construction. Thus, molten resin is injected into a cavity defined by the molding surfaces 25 and 33, and molded in a state that the lower lens layer 11 is inserted in the cavity. N2 indicates an injection nozzle for injecting molten resin into the resin injection port of the hot runner 28.

The method for molding a layered lens by using the mold assembly shown in FIG. 5 will now be described.

The rotary table 30 descends toward the fixed table 20, the upper and lower molds are coupled with each other, and a lower lens layer 11 is injection molded by the combination of the molds 32 and 22. The rotary table 30 ascents away from the fixed table 20. At this time, the lower lens layer 11 is left attached to the molding surface 33 of the upper mold 32. The rotary table 30 is turned 180°, so that the upper mold 32 faces the lower mold 24, and the upper mold 34 faces the lower mold 22. Then, the rotary table 30 descends toward the fixed table 20 once again. The upper and lower molds are thus coupled with each other. An upper lens layer 14 is molded on the lower lens layer 11 by the molds 32 and 34. The upper molds 32 and 34 have exactly the same shape. When the lower lens layer 11 is molded by the molds 32 and 22, the molds 34 and 24 layer the upper lens layer 14 on the lower lens layer 11. When the molds 32 and 24 layer the upper lens layer 14 on the lower lens layer 11, the molds 34 and 22 mold another lower lens layer 11. In this way, the pre-molding and the post-molding of the lens are concurrently carried out. The molded product, i.e., a layered lens, taken out of the lower mold 24 after the mold break process, is subjected to cutting process where the gate scar G2 of the upper lens layer 14 is removed. A desired integrally layered lens is thus completed.

The surface (surface of the upper lens layer 14) of the lens 10 is frequently marked with a manufacturers mark, a lamp maker mark, or a standard approved mark, such as an SAE mark. In this case, the gate scar G1 of the lower lens layer 11 is positioned behind this mark. If so positioned, the concealment of the gate scar G1 is further enhanced, and the appearance of the lens is further improved.

In the preferred embodiment, the hot tip is used only for the molding of the lower lens layer 11. However, it may also be used for the molding of the upper lens layer 14, thereby eliminating the gate cut. The gate scar may be positioned proximate the mark or may form a part of the mark. This enhances appearance of the lens and simplifies the necessary post-process work.

In the synthetic resin layered lens of the preferred embodiment, the gate scar of the lower lens layer is completely hidden by the upper lens layer layered on the lower lens layer. Accordingly, the outside appearance of the resultant layered lens is good, and various problems associated with the gate scar left are solved.

In the method of molding the synthetic resin layered, the gate scar formed on the lower lens layer is covered with the upper lens layer in the process for layering the upper lens layer on the lower lens layer to form an integral construction. Accordingly, only the gate scar of the upper lens layer, created when it is molded, is left on the molded lens. A cutting process to remove the scar is this simple. Finally, the disclosed process can be controlled in a known manner.

The invention has been described through preferred embodiments. However, it will be apparent to one skilled in the art that various modifications can be made thereto without departing from the scope of the invention as defined by the appended claims.

What is claimed is:

1. An apparatus for molding a synthetic resin layered lens, said apparatus comprising:

a first mold element having a hot runner formed therein;

a second mold element which cooperates with the first mold element to define a first cavity;

means for injecting a first resin into said first cavity through said hot runner to form a lower lens element, a tip of said hot runner, which opens into said first cavity, being disposed at a position which corresponds to a contact surface of the lower lens element;

a third mold element;

means for transferring the lower lens element from said first cavity to a position opposite said third mold element to define a second cavity between the contact surface and said third mold element; and means for injecting a second resin into said second cavity to form an upper lens element on the contact surface of the lower lens element;

wherein a gate through which the second resin is injected into the second cavity is positioned at an outer most peripheral surface of the second cavity said position corresponding to the outer most periphery of the upper lens element.

2. An apparatus of claim 1, wherein said first mold element comprises a concave portion for molding seal legs of said lens.

3. An apparatus according to claim 1, wherein said gate is formed by a surface on said second mold element and a surface on said third mold element.

4. An apparatus according to claim 3, wherein said gate is formed by said surface on said second mold element and said surface on said third mold element at a point where said gate is connected to said second cavity.

5. An apparatus according to claim 1, wherein said means for injecting a second resin further comprises a hot runner in said third mold element.

6. An apparatus according to claim 5, wherein said means for injecting a second resin further comprises a sprue located at least partially in said third mold element between said hot runner and said gate.

7. An apparatus according to claim 6, wherein said sprue is formed by a first recess in said second mold element and a second recess in said third mold element.

8. An apparatus according to claim 1, wherein said first and third mold elements are separate from each other.

\* \* \* \* \*